(12) United States Patent
Indars et al.

(10) Patent No.: US 7,388,675 B2
(45) Date of Patent: Jun. 17, 2008

(54) INTERFEROMETERS FOR THE MEASUREMENT OF LARGE DIAMETER THIN WAFERS

(75) Inventors: Gunars Indars, Littleton, MA (US); Anatoliy E. Rzhanov, Westford, MA (US)

(73) Assignee: Valley Design Corporation, Shirley, MA (US)

( * ) Notice: Subject to any disclaimer, the term of this patent is extended or adjusted under 35 U.S.C. 154(b) by 160 days.

(21) Appl. No.: 11/278,507

(22) Filed: Apr. 3, 2006

(65) Prior Publication Data

US 2007/0229847 A1    Oct. 4, 2007

(51) Int. Cl.
    *G01B 11/02*    (2006.01)
(52) U.S. Cl. .................................... 356/514
(58) Field of Classification Search ............... 356/497, 356/514
    See application file for complete search history.

(56) References Cited

U.S. PATENT DOCUMENTS

| | | | |
|---|---|---|---|
| 5,054,925 A | | 10/1991 | Hunter |
| 5,291,269 A | * | 3/1994 | Ledger ........................ 356/504 |
| 5,488,477 A | * | 1/1996 | de Groot ..................... 356/514 |
| 5,671,050 A | * | 9/1997 | de Groot ..................... 356/497 |
| 5,694,217 A | | 12/1997 | Hizuka |
| 5,986,759 A | | 11/1999 | DeCain et al. |
| 6,359,692 B1 | * | 3/2002 | Groot ........................... 356/512 |
| 6,381,015 B1 | | 4/2002 | Sonehara et al. |
| 6,744,522 B2 | * | 6/2004 | De Groot et al. ............ 356/503 |
| 6,972,850 B2 | | 12/2005 | Ohtsuka et al. |
| 7,002,694 B2 | * | 2/2006 | Schulte et al. ............... 356/512 |
| 2005/0134864 A1 | * | 6/2005 | Deck ............................ 356/514 |

OTHER PUBLICATIONS

"Precision Optical Engineering", 1996, Appendix A, pp. a-g, published in by Matra BAe Dynamics (UK) Ltd. in London, UK.
"Optical Shop Testing", second edition, edited by Daniel Malacara, 1992, pp. 1-18, published by John Wiley & Sons, Inc., Hoboken, NJ, USA.
J.E. Nestell et al., "Derivation of Optical Constants of Metal from Thin-film Measurments at Oblique Incidence," Applied Optics, Mar. 1972, pp. 643-651, vol. 11(3), published by the Optical Society of America, Washington D.C.
M. Born, E. Wolf, "Principles of Optics," 1965, published by Pergamon Press (now Reed Elsevier group, Amsterdam).

* cited by examiner

*Primary Examiner*—Patrick Connolly
*Assistant Examiner*—Jonathan Skovholt
(74) *Attorney, Agent, or Firm*—Synnestvedt & Lechner LLP

(57) ABSTRACT

An interferometer for measuring the flatness, variation of thickness and parallelism of large, thin transparent wafers held vertically and undistorted by gravitational forces. A sodium lamp provides monochromatic light that is diffusely reflected off a background screen towards the wafer. A reference flat surface is positioned sufficiently closely to the wafer that an interference fringe pattern is formed that is a measure of the air gap between the reference flat surface and the surface of the wafer being measured. The background screen is angled so that the fringe pattern, which is localized at the air gap can be viewed at an angle to a normal to the wafer. The background screen has trapezoidal markings that, when viewed at the angle required to see the fringes, appear as a grid. This allows counting of the number of fringes visible within a fixed distance to characterize the surface flatness.

20 Claims, 6 Drawing Sheets

INTERFEROMETERS FOR THE MEASUREMENT OF LARGE DIAMETER THIN WAFERS

FIELD OF THE INVENTION

The present invention relates to interferometers for measuring large thin wafers and particularly to interferometers for measuring the flatness or parallelism of large thin transparent wafers held vertically.

BACKGROUND OF THE INVENTION

Large diameter (up to 300 mm), thin (0.5 mm and less) transparent wafers are becoming increasingly important in modem semiconductor and biomedical device processing and manufacture. Moreover, these large, thin, transparent wafers require surfaces that are flat to similar tolerances as those found in polished silicon wafers traditionally used in semiconductor processing and manufacture, i.e., the wafer surface must be flat to better than a tenth of the wavelength of visible light. Such surface flatness is traditionally characterized as flat to $\lambda/10$, where the wavelength $\lambda$ is approximately 0.5 µm. This degree of surface flatness may be measured using an interferometer. This is a well known type of instrument in which a surface is compared with a reference surface by observing the patterns of interference fringes when the surfaces are brought in close proximity, either virtually or in reality, under appropriate illumination. These fringes are formed as wave fronts of light reflected from each surface constructively and destructively interfere with each other, enabling measurements of differences in separation of a fraction a wavelength.

FIG. 1 shows a traditional industrial interferometer 10, referred to as a Newton Interferometer, that is widely used to interferometrically test large optical components such as telescope mirrors. The operation of a Newton Interferometer is described in detail, for instance, on pages 1-18 of "Optical Shop Testing", second edition, edited by Daniel Malacara and published in 1992 by John Wiley & Sons, Inc. of Hoboken, N.J., the contents of which are hereby incorporated by reference.

A Newton Interferometer uses an essentially monochromatic light source 12, such as a low-pressure sodium vapor lamp emitting yellow light at 589 nm. This is passed through a diffuser 14 and a beam-splitter 18 to illuminate the optical surface to be tested 22 that is in close proximity to a reference flat 20. Because sodium has a coherence length on the order of millimeters, an observer 24 looking at the surface to be tested 22 via its reflection of the semi-reflecting surface 18 will see a series of light and dark fringes. These fringes are interference fringes. A light fringe is caused by constructive interference in which the optical path difference between a ray reflected from the surface to be tested 22 and a ray reflected from the reference surface 20 is an integer number of the wavelength of the illuminating light. A dark fringe is caused by destructive interference in which the path difference is a half a wavelength of the illuminating light, or an integer multiple thereof. It can be shown that the location of a light fringe at a first point and an adjacent dark fringe at a second point indicates a difference in separation between the reference surface 20 and the surface being tested 22 of $\lambda/4$, or 147.5 nm at the two points.

The problem of using a Newton Interferometer for testing large thin wafers is that such wafers deform under gravity when oriented horizontally. In order to test a 300 mm wafer, a reference flat of larger diameter having a surface flatness of $\lambda/20$ would be required. The problem, however, is that if a 0.5 mm thick wafer that has a curved surface is placed on top of such a reference flat, it would simply bend and conform to the surface. So all large thin wafers tested in a Newton Interferometer would have distortions due to gravity and may even appear to have flat surfaces, even though they may have local curvatures and other deformities.

While many other interferometers are known, none is well suited to the task of easily and cheaply measuring the flatness of a large diameter (up to 300 mm), thin (0.5 mm and less) transparent wafer to the accuracies required.

For instance, U.S. Pat. No. 6,744,522 describes an interferometer for measuring the thickness profile of thin transparent substrates. This patent describes a method in which a selected location on the object is chosen, and an interference pattern is obtained at a first wave-length. This pattern is used to obtain a first estimate of optical thickness. The procedure is repeated at the same location using a second wavelength to obtain a second estimate of the optical thickness. A third estimate of the optical thickness is then calculated by combining the first and second estimates. This process allows the various errors inherent in the measurements, including the effects of multiple reflections from both surfaces of the sample, to be reduced. The process is lengthy and complicated, and this patent serves to emphasize the problem of making thickness profile measurements on thin transparent samples.

U.S. Pat. No. 5,694,217 describes an interferometer used for testing optical surfaces and the stress and strain within a thin specimen. It is an example of the application of polarized waves using $\lambda/4$ plates. The use of polarized light for the measurement and the need to extract the results from experimental data make this approach too complicated for high-volume measurements of large components.

U.S. Pat. No. 5,054,925 describes a method for aligning an interferometer.

U.S. Pat. No. 6,972,850 describes an apparatus and method for measuring the shape of the optical surface using interferometer. Both the light reflected by the reference surface and the light reflected by the surface to be measured are made to interfere. This method is intended for curved surface measurements, and the procedure is complicated.

U.S. Pat. No. 6,381,015 describes an inspection apparatus directed to biomedical analysis. The apparatus includes an optical interferometer, a phase modulator and a photo detector. The spectrum of the electrical signal contains information about an illuminated sample. This equipment is expensive.

U.S. Pat. No. 5,986,759 describes an optical interferometer with two optical outputs that produces two linearly independent signals, allowing high quality measurements to be made. This equipment is, however, expensive and complex to operate.

The review of patents demonstrates that it is desirable to provide an interferometer system that is capable of measuring precisely and efficiently the flatness of thin, transparent wafers with large diameters and the profile of wafer surfaces to satisfy modern industrial needs.

SUMMARY OF THE INVENTION

Briefly described, the invention provides an interferometer for measuring the flatness and thickness of large, thin transparent wafers.

In a preferred embodiment of the interferometer, essentially monochromatic light emitted from a source such as, but not limited to, a low pressure sodium vapor lamp, is diffusely reflected off a background screen toward a thin transparent wafer. The wafer is held vertically, i.e. a normal to the wafer surface is horizontal, so that its surface is not distorted by gravitational forces. A reference flat surface is positioned sufficiently close to the surface of the wafer being measured that an interference fringe pattern is formed. The interference pattern can be seen both in transmission and in reflection. In transmission, the interference pattern is the result of interference between two beams of light, one beam having been transmitted directly and the other having been reflected of the reference flat surface and then off the surface being measured. In reflection, the interference pattern is the result of interference between one beam reflected off the surface to be measured and one beam reflected off the reference flat surface. Such interference patterns are a measure of the thickness of the air gap between the reference flat surface and the surface of the wafer being measured. Their formation requires that the light forming the fringes is monochromatic and has a coherence length of about twice the thickness of the air gap. As the reference surface is polished be flat to λ/20, any variations in the air gap are effectively measurements of the undulations in the surface of the wafer. The background screen is angled so that the fringe pattern, which is localized at the air gap can be viewed at an angle to the normal to the wafer. The background screen has trapezoidal markings on it that, when viewed at the angle required to see the fringes, appear as a grid. This allows counting of the number of fringes visible within a fixed distance that is a well-known way to characterize surface flatness.

In addition to viewing the fringe pattern formed by the air gap between wafer surface being measured and the reference flat surface, a second interference fringe pattern, located at infinity can be observed. This second interference pattern is formed by reflections off the two surfaces of the wafer. It can be observed if the wafer thickness is of the order of a quarter of the coherence length of the light source. This second fringe pattern is ideally a set of concentric circular fringes and represents a measure of how parallel the two wafer surfaces are.

These and other features of the invention will be more fully understood by references to the following drawings.

DETAILED DESCRIPTION

The present invention applies to the measurement of the surfaces of large, thin, transparent wafers, particularly the surface flatness and parallelism of such wafers.

By positioning the thin wafer vertically, i.e., so that a normal to the surface being tested is horizontal, the wafer can assume in its true shape and be tested, undistorted by gravity.

A preferred embodiment of the invention will now be described in detail by reference to the accompanying drawings in which, as far as possible, like elements are designated by like numbers.

Figure 1:
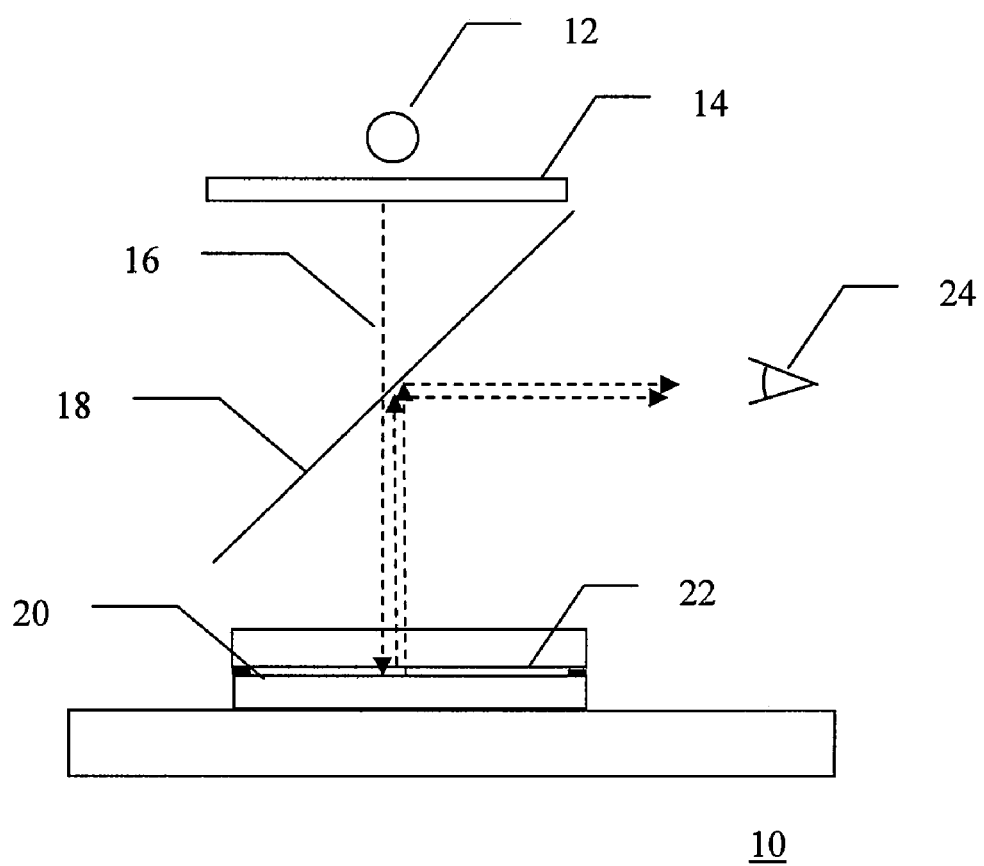
FIG. 1 is a schematic side elevation view of a prior art, Newton Interferometer.
Figure 2:
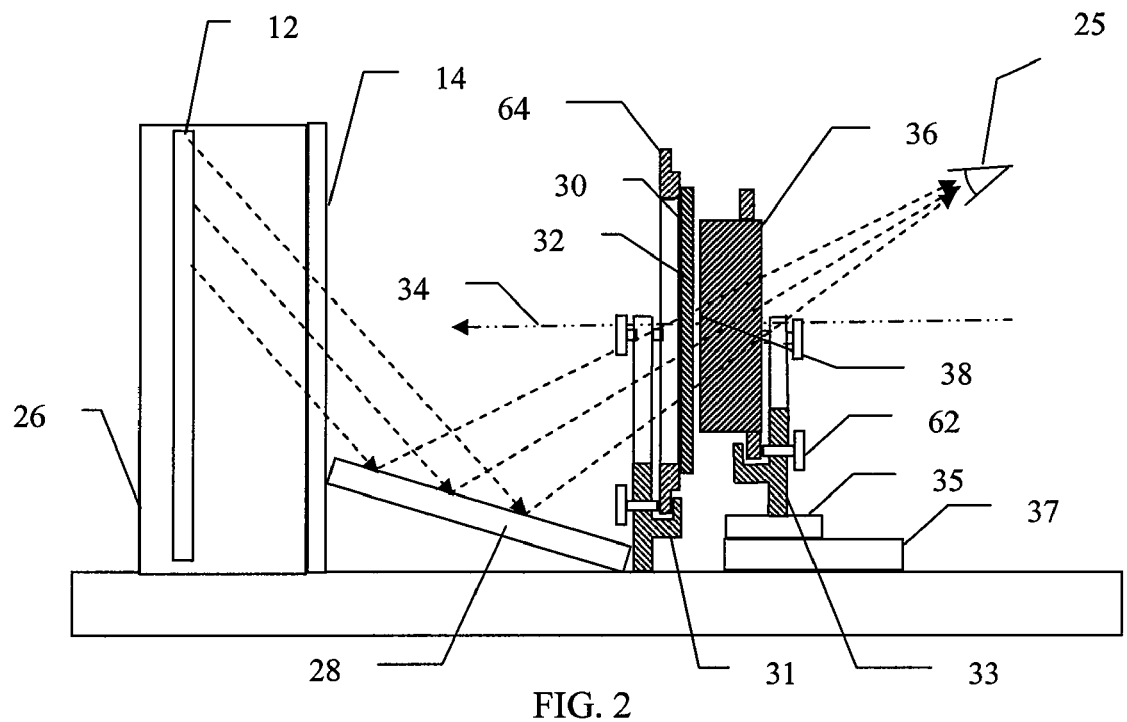
FIG. 2 is a schematic, cross-sectional, side elevation view of one embodiment of the interferometer of this invention showing it used to measure the flatness of a thin transparent wafer.

FIG. 2 is a schematic side elevation view of one embodiment of the interferometer of this invention showing it being used to measure the flatness of a thin transparent wafer. The interferometer 10 includes a light source 12, a light diffuser 14, a diffusely reflecting background screen 28, a wafer holder cassette 31, a ring holder 64, a reference optic 36 having a reference flat surface 38, a reference optic holder 33, a coarse positioning module 37 and a fine positioning module 35.

The large, thin transparent wafer 30 is attached to the ring holder 64 which is held in the wafer holder 31 by three micrometer screws 62. In this way, the large, thin transparent wafer 30 is held vertically, i.e. so that a normal 34 to the wafer surface 32 being tested is horizontal. This arrangement has the advantage that the large, thin transparent wafer 30 is not distorted by gravitational forces and the wafer surface 32 can be accurately measured for surface flatness.

To measure the surface flatness, a reference flat surface 38 of the reference optic 36 is brought into close proximity with the wafer surface 32 being tested. This motion may be accomplished by means of the coarse positioning module 37 and the fine positioning module 35. Both of these modules provide horizontal, lateral and vertical adjustment of the position of the reference optic 36 by means of, for instance, precision screw mechanisms. The reference flat surface 38 may be held in the reference optic holder 33 by a set of three micrometer screws 62. This allows the orientation of the reference flat surface 38 to be adjusted precisely. When the reference flat surface 38 is sufficiently close and parallel to the wafer surface 32 being tested, a set of interference fringes is formed that are localized at the wafer surface 32 being tested. These fringes are the result of light that is diffusely reflected from the diffusely reflecting background screen 28 and can be seen off axis at an off-axis viewing position 25. Details of how these fringes are formed are discussed below by reference to FIG. 5. An important aspect of these fringes is that they represent a measurement of the distance between the wafer surface 32 being tested and the reference flat surface 38. As the reference flat surface 38 is flat to λ/20, any variation in the distance between the wafer surface 32 being tested and the reference flat surface 38 can be attributed to variation in the surface flatness of the wafer surface 32 being tested.

In order for the interference fringes to be formed, the coherence length of the light source 12 must be a bout four times the distance between the wafer surface 32 being tested and the reference flat surface 38. For practical testing, monochromatic light sources such as, but not limited to, a low pressure sodium lamp may be used. Such a source emits monochromatic light at 589.3 nm and has a coherence length that is on the order of millimeters. Other suitable monochromatic lights include a low-pressure mercury lamp's 546.1 nm emission, provided that other wavelengths are filtered out by a green filter, or a low-pressure helium discharge lamps 587.6 nm emission, suitably filtered by a yellow filter.

The parabolic reflector 26 and the light diffuser 14 may be used provide uniform illumination over a large area so that the fringes are clearly visible. In one embodiment of the invention the cross-section of the light beam is about 400 $cm^2$ (about 0.43 sq ft) and has a highly uniform intensity distribution.

Figure 3:
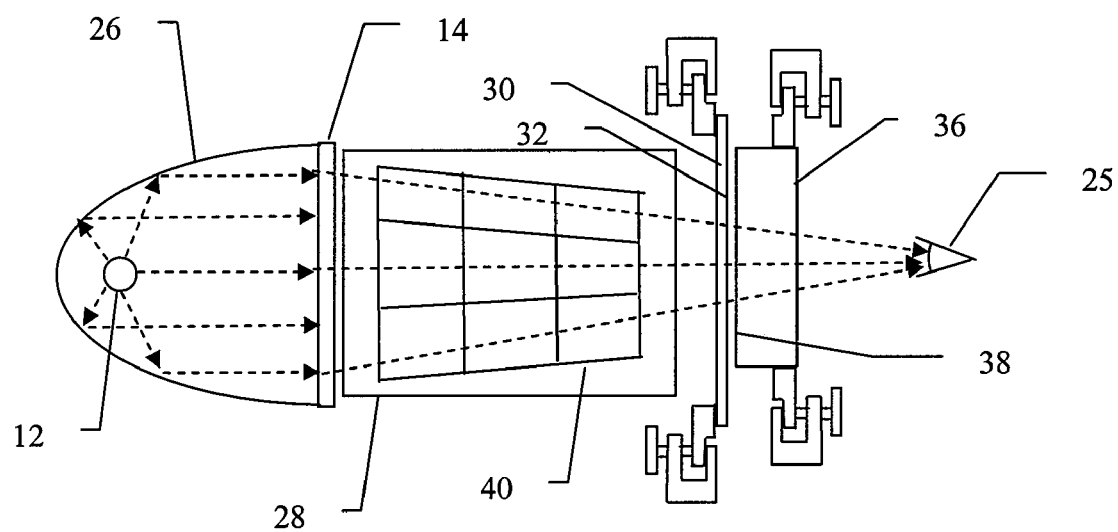
FIG. 3 is a schematic plan view of one embodiment of the interferometer of this invention showing it used to measure the flatness of a thin transparent wafer.

FIG. 3 is a schematic plan view of one embodiment of the interferometer of this invention showing it used to measure the flatness of a thin transparent wafer. The light source 12 emits monochromatic light that is collimated by the parabolic reflector 26 onto the light diffuser 14. This provides a large area of uniform, diffuse, monochromatic light. The light diffuser 14 is typically made of matte glass and serves to further improve uniformity of intensity and distribution of the output beam by diffusive dispersion.

Some of this light is diffusely reflected off the diffusely reflecting background screen 28 toward the large, thin transparent wafer 30 that is aligned to be parallel with the reference optic 36. Interference fringes are formed localized at the wafer surface 32 being tested. These fringes may be seen at the off-axis viewing position 25, and they represent the distance between the wafer surface 32 being tested and the reference flat surface 38 of the reference optic 36.

The diffusely reflecting background screen 28 has a trapezoidal marking 40 on its surface. When viewed from the off-axis viewing position 25, the trapezoidal marking 40 appears as a rectilinear grid.

Figure 4:
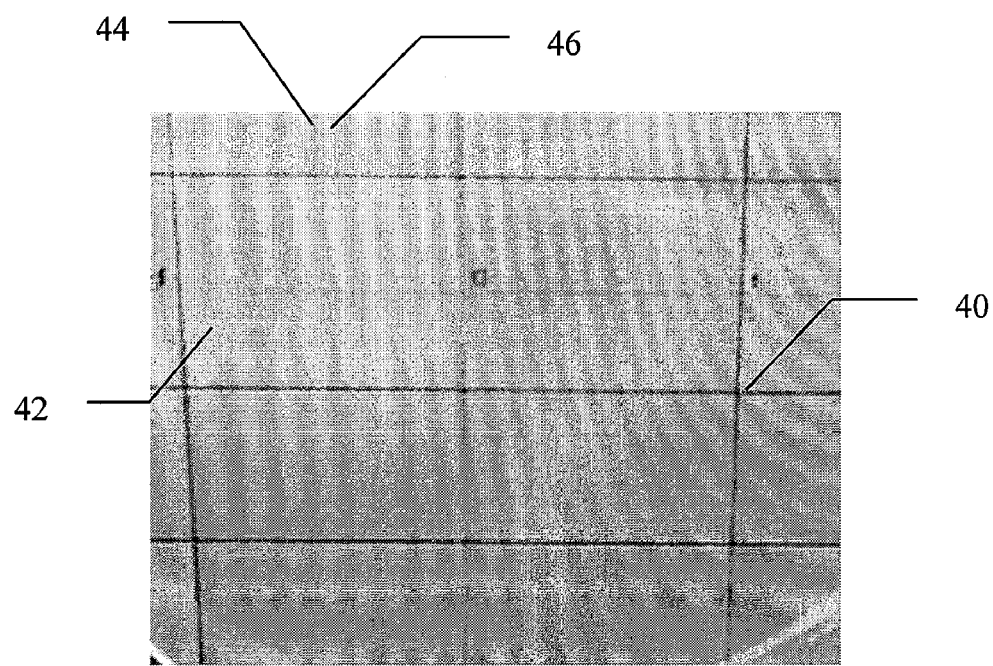
FIG. 4 is an interference fringe pattern viewed against a measurement grid in one embodiment of the interferometer of this invention being used to measure the flatness of a thin transparent wafer.

FIG. 4 shows an interference fringe pattern viewed against a measurement grid in one embodiment of the interferometer of this invention being used to measure the flatness of a thin transparent wafer. The interference fringe pattern 42 consists of light fringes 46 and dark fringes 44. As detailed below, appearance of a light fringe 46 at a first point and an adjacent dark fringe 44 at a second point represents a difference in the distance between the wafer surface 32 being tested and the reference flat surface 38 at the two points of $\lambda/4$, i.e., about 122.5 nm. The trapezoidal markings 40 on the diffusely reflecting background screen 28 appear as a rectilinear measurement grid when seen from the off-axis viewing position 25. This allows the variation in surface flatness of the wafer surface 32 being tested to be readily observed as a number of fringes per unit distance, typically fringes per inch, which is a traditional way of specifying, characterizing and reporting surface flatness in the optical industry.

Interference fringe patterns 42 (also known as interferograms) are well known and have been extensively analyzed and tabulated in, for example, on pages 1-18 of "Optical Shop Testing", second edition, edited by Daniel Malacara and published in 1992 by John Willey & Sons Inc, of Hoboken, N.J., and in "Precision Optical Engineering", Appendix A, pp. a-g published in 1996 by Matra Bae Dynamics (UK) Limited in London, UK, the contents of both of which are hereby incorporated by reference. Computer programs have also been developed for the refinement and interpretation of fringes as described in the article by J. E. Nestell et al. entitled "Derivation of Optical Constants of Metal from Thin-film Measurements at Oblique Incidence" in Applied Optics, Volume 11(3), pp. 643-651, published by the Optical Society of America, in Washington, D.C. in March 1972, the contents of which are hereby incorporated by reference.

In a preferred embodiment of the invention large, thin transparent wafer 30 may be tested in the following way.

The light source 12 should be turned on and warmed up for about 15 minutes prior to the measurement in order for the vapor pressure of sodium in the tube to stabilize and so minimize the intensity fluctuations of the emitted light.

Figure 5:
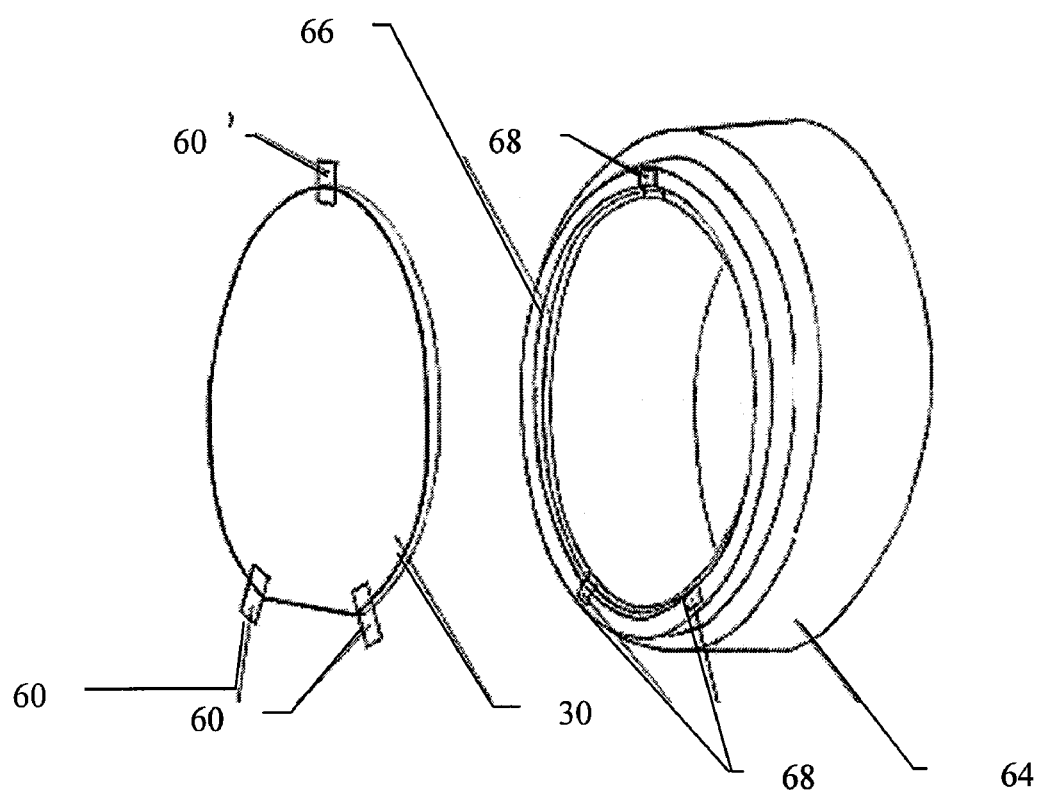
FIG. 5 is a perspective view of a ring holder illustrating a first step in loading a large, thin transparent wafer onto a ring holder for testing.

The large, thin transparent wafer 30 sample to be tested may be installed onto a ring holder 64 of corresponding diameter, as shown in FIG. 5. Insulating paper tape 60 is first attached to the front surface of the ring holder 64 at three points. Adhesive paper tape 60 pieces are then attached to the large, thin transparent wafer 30, spaced at corresponding locations. The large, thin transparent wafer 30 sample is then connected to the ring holder 64 by the adhesive paper tape 60 pieces at the points where the insulating paper tape 68 pieces were previously placed. In this way, the large, thin transparent wafer 30 is attached at three points of contact which is well known to be the optimal number of contact points for holding a planar surface without introducing stresses. Visual confirmation may then made that the large, thin transparent wafer 30 does not have direct contact with the ring holder 64, but it is hanging by the adhesive paper tape 60 in the vertical position. In an alternative embodiment, the large, thin transparent wafer 30 may be held in place by vacuum, preferably against only three points of contact.

Figure 6:
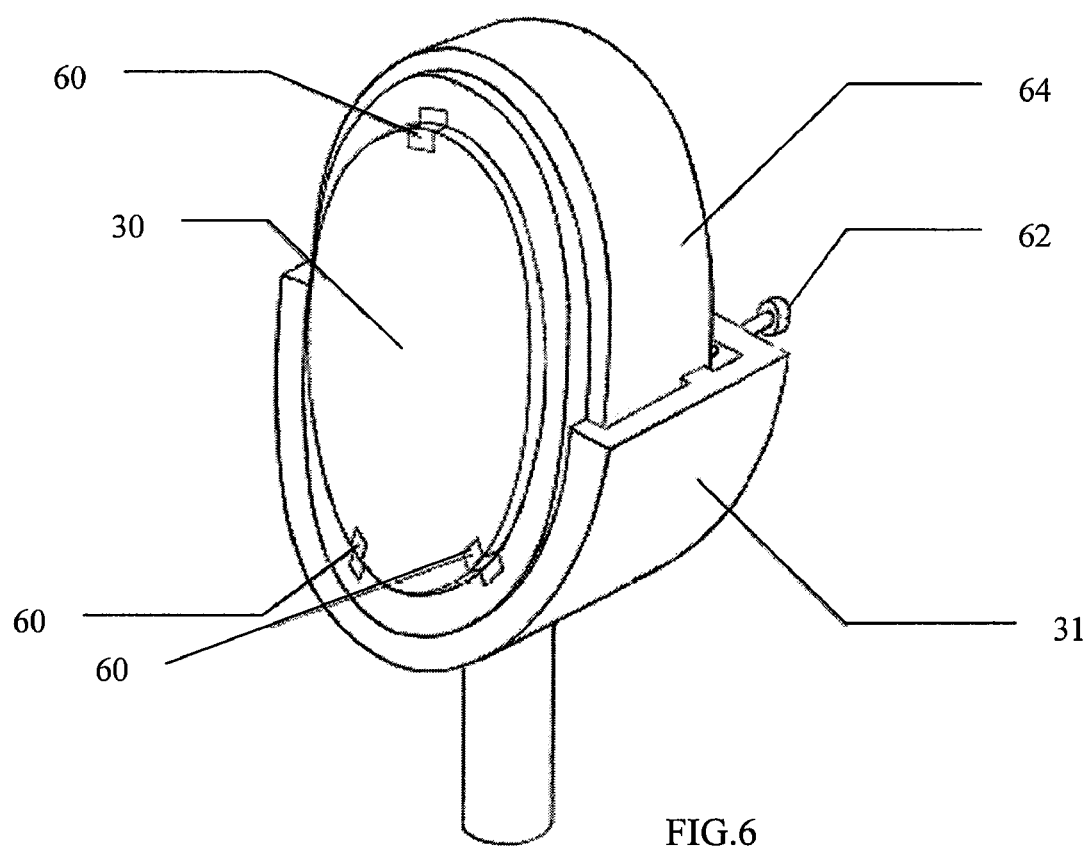
FIG. 6 is a perspective view of the ring holder illustrating the large, thin transparent wafer loaded onto a ring holder for testing.

The ring holder 64 and the attached large, thin transparent wafer 30 may then be carefully installed into the wafer holder cassette 31, as shown in FIG. 6. This may be done carefully and accurately, with the large, thin transparent wafer 30 maintained in the vertical direction, so that the large, thin transparent wafer 30 does not touch the metallic parts. The large, thin transparent wafer 30 may be turned to face the reference flat surface 38 of the reference optic 36. The reference optic 36 may also be mounted on its holder that also has micrometric screws 62 for adjustment.

Figure 7:
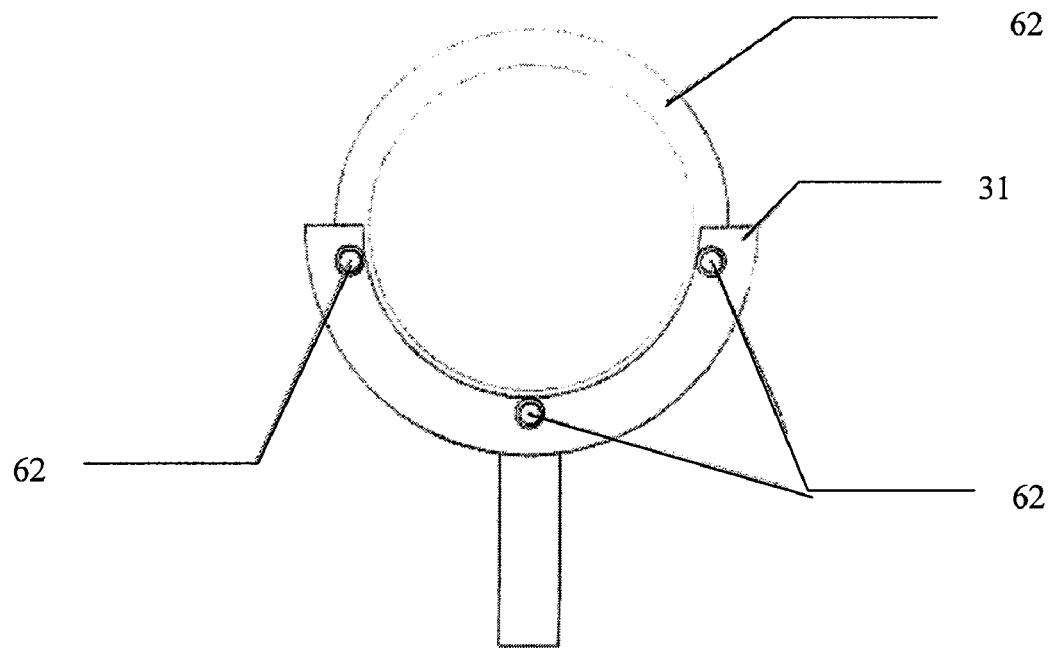
FIG. 7 shows another view of a large, thin transparent wafer loaded onto a ring holder for testing.

As shown in FIG. 7, the ring holder 64 may be fixed in the cassette 31 by three micrometer screws 62 so that the sample may be positioned in front of the reference flat surface 38 of the reference optic 36, and the ring holder 64 does not move laterally or vibrate.

The holder with the reference optic 36 glass flat may then be moved carefully forward toward the large, thin transparent wafer 30 sample, preferably without touching the sample's surface, to determine whether the surfaces are parallel. If they are not parallel and some inclination can be seen, the reference optic 36 glass flat is moved back from the large, thin transparent wafer 30 sample, and the micrometer screws are adjusted to correct the orientation of the flat respectively to the surface of the wafer. When the wafer surface 32 being tested and reference flat surface 38 appear to be parallel on visual inspection, the reference optic 36 is moved toward the large, thin transparent wafer 30 sample until it is close enough to locate the interference pattern. Location of the interference fringe pattern 42 may be facilitated by a slight back and forth motion using the fine positioning module 35 as well as any necessary adjustments of the micrometric screws holding the reference optic 36. As a rule, the pattern appears almost immediately. If the pattern is not, however, seen, the adjustment procedure should be repeated, i.e., the reference optic 36 moved back, and adjusted to appear parallel to the wafer surface 32 being tested. Usually a clear interference fringe pattern 42 is seen, located on the wafer surface 32 being tested, within two or three iterations of this test set up procedure.

Precision adjustments should be used when observing the interference fringe pattern 42. Using the micrometric screws in turn and in very tiny steps, it is possible to watch the evolution of the interference fringe pattern 42. Each step of the adjustment should be aimed to enlarge the width of the fringes. At the center of the system they should be as large as possible. During this procedure, a very slight motion of the reference optic 36 back and forth with respect to the large, thin transparent wafer 30 and repetition of the precision adjustment step are particularly helpful.

The larger the spacing between the fringes of the pattern, the more parallel the wafer surface 32 being tested and the reference flat surface 38, and the more precise the measurement of the surface flatness. The measurement results are highly repeatable and allow for a precise estimation of surface quality. Repeating the measurement procedure may also increases the precision.

An indication that the optimum position for measurement has been reached is that the large, thin transparent wafer 30 starts to move together with the reference optic 36 glass flat as if the are adhered together. This is a consequence of the gap between the wafer surface 32 being tested and the reference flat surface 38 becoming less than the mean free path of molecules in air, i.e. a separation on the order of one µm. The result is that motion of the reference optic 36 is translated directly via the air molecules to the large, thin transparent wafer 30. The effect can be seen by observing the upper paper strap retaining the sample, and seeing the tension in it when moving the reference optic 36 slightly back and forth. The reference flat surface 38 and the wafer surface 32 being tested move essentially in concert but are separated by a finite gap. This is the optimum location for observing the interference fringes.

When the adjustment has been made and the optimal position located, an estimate of the surface flatness of the wafer surface 32 being tested may be calculated by simply counting the number of whole fringes per inch along the radius of the wafer. The result of this visual observation may then be multiplied by $\lambda_0/4$ to obtain actual separation in nm, as detailed in equation (6) below. Alternatively, the deviation of the wafer surface 32 from perfect flatness one may be expressed in terms of wavelengths per inch. An optical specification of allowed deviation from a perfectly flat surface is usually expressed as a number of $\lambda_0$/in.

The interferometer has been designed both for laboratory measurements and for industrial applications. The industrial applications typically involve routine measurements of a series of samples. This type of operation may be facilitated by having wafer holder cassette 31 that can be changed easily and quickly. To accomplish this, a series of ring holders 64 of precise dimensions may be provided, so that they can be fixed in the cassette at the same position respectively to the reference flat surface 38 of the reference optic 36. Having precision, interchangeable ring holders 64 simplifies the adjustment when changing them in the wafer holder cassette 31.

Changing the large, thin transparent wafer 30 may then be accomplished as follows.

First, move the holder of the reference optic 36 to prevent touching or scraping the large, thin transparent wafer 30 against the reference flat surface 38. This slight movement should be made exactly along the optical axis of the set up without touching any of the micrometric screws of the holder of the reference optic 36.

Second, the measured sample, i.e. the large, thin transparent wafer 30 attached to the ring holder 64 may be released from the wafer holder cassette 31 by loosening the retaining screws 62 located on the far side of the wafer holder cassette 31, as shown in FIG. 7. The measured sample may then be carefully lifted off the wafer holder cassette 31 and replaced by the next sample, i.e. the next large, thin transparent wafer 30 attached to another ring holder 64 and the retaining screws 62 tightened.

The reference optic 36 may then be moved toward the wafer surface 32 being tested to try to locate the fringes as the parallelism of the surfaces is guaranteed by the precision, interchangeable ring holder 64. Only minor manipulation of the reference optic 36 should then be required to find the clear interference pattern and carry out the measurement. The same process can be repeated for a whole series of samples.

Having the large, thin transparent wafer 30 held vertically also allows the measurement of how parallel the wafer surfaces are too each other, as long as the wafer thickness is less than the coherence length of the light being used.

Figure 8:
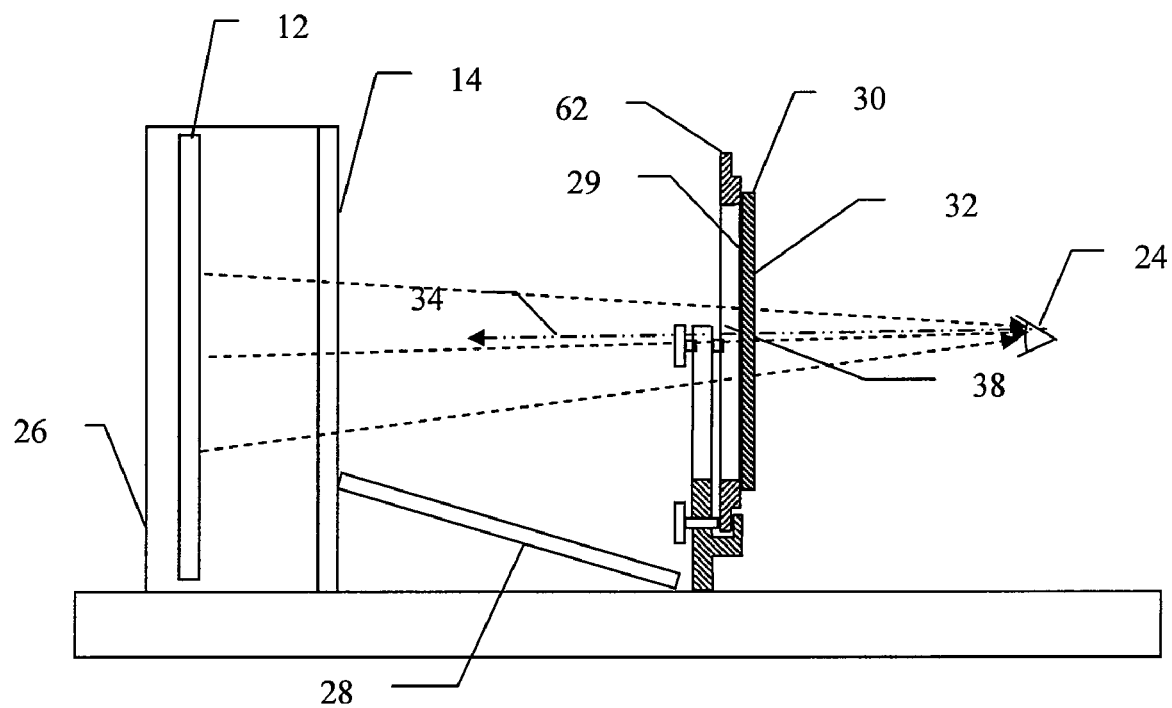
FIG. 8 is a schematic, cross-sectional side elevation view of one embodiment of the interferometer of this invention showing it used to measure the how parallel the two surfaces of a thin transparent wafer are.

FIG. 8 shows a schematic side elevation view of one embodiment of the interferometer of this invention showing it used to measure the how parallel the two surfaces of a thin transparent wafer are to each other. The reference optic is not required in this embodiment. As detailed below, the coherence length of a low-pressure sodium lamp is sufficiently long and the thickness of the wafers sufficiently small, that a second interference fringe pattern 42 can be observed at on-axis viewing position 24. These fringes of equal inclination 70 are located at infinity. The fringes of equal inclination 70 are formed by interference between light reflected from wafer surface 32 and the wafer surface 29. The fringes of equal inclination 70 are, therefore, a measure of how parallel the wafer surface 29 and the wafer surface 32 are to each other. If these two surfaces are parallel the fringes of equal inclination 70 appear as a series of concentric rings centered on the optical axis at infinity. Deviations from this pattern are indications of deviations from parallel of the two surfaces, as is well known in the art and is described in more detail below.

Figure 9:
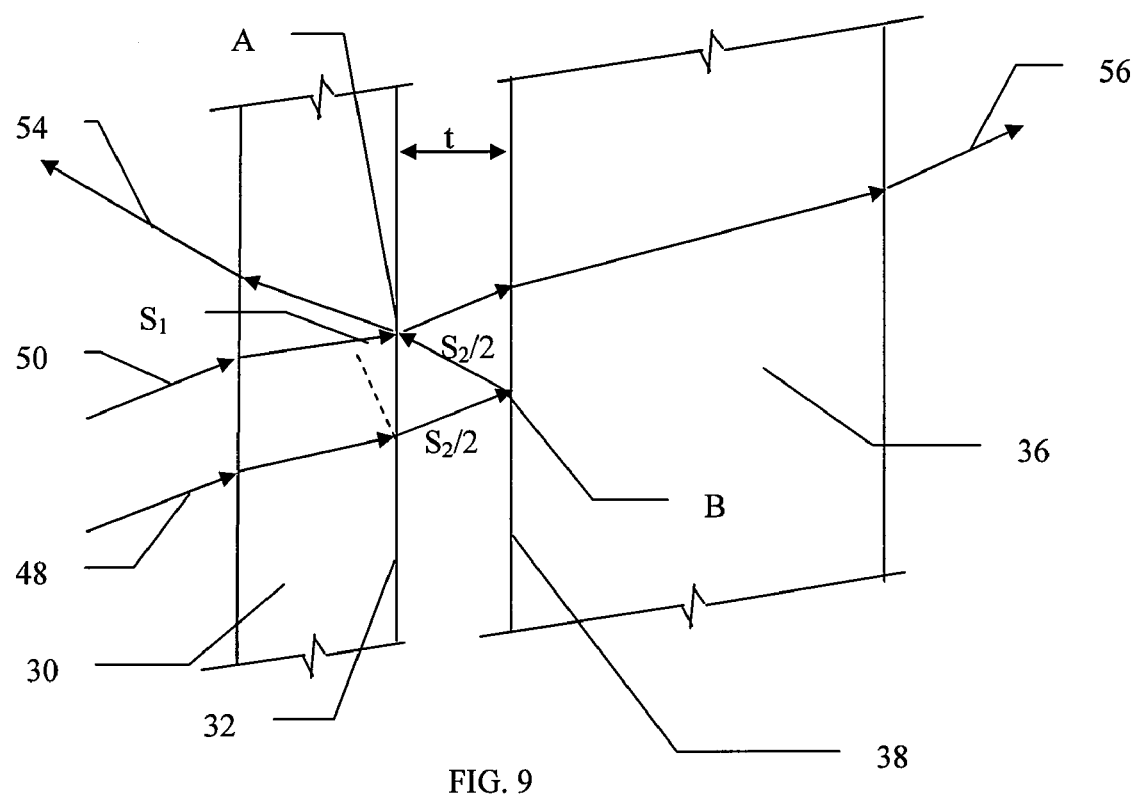
FIG. 9 is a more detailed side elevation view showing how an interference fringe pattern is formed in one embodiment of the interferometer of this invention.

FIG. 9 shows in more detail how an interference fringe pattern 42 is formed in one embodiment of the interferometer of this invention. The interference of two coherent beams takes place at point A of the surface of the sample, and fringes can be observed both in transmitted and in reflected light.

It can be shown that the difference of the optical path of beams 48 and 50, shown in FIG. 9, prior to where they interfere at point A is equal to:

$$\Delta = s_2 - s_1 = 2t \cdot \sqrt{1 - \sin^2 i_0} \qquad (1)$$

where $n_1$—is the index of refraction of the wafer material, t—is the thickness of air film between the sample and glass flat, having an index of refraction $n_2$, $i_0$—is the angle of incidence of light onto the sample. In order to take into account the phase shift at the boundary air—glass flat, shown as point B in FIG. 5, the term $\lambda_0/2$ should be added to or subtracted from the difference of the optical path.

The maximum intensity of light will be observed at point A when the difference of the optical path is equal to:

$$\Delta_{max} = 2m \cdot \frac{\lambda_0}{2} + \frac{\lambda_0}{2} = (2m+1)\frac{\lambda_0}{2} \quad (2)$$

and the minimum of intensity will exist when $$\Delta_{min} = (2m-1)\frac{\lambda_0}{2} + \frac{\lambda_0}{2} = 2m \cdot \frac{\lambda_0}{2} \quad (3)$$

where m—is the integer.

The width of the fringe corresponds to the distance between neighboring points in the interference pattern with a maximum and minimum of intensity, and the increment in Δ between them is equal to difference between expressions (2) and (3)

$$\delta\Delta = \Delta_{max} - \Delta_{min} = \frac{\lambda_0}{2} \quad (4)$$

The value of the increment corresponds to the difference in thicknesses of the air film δt along the width of the fringe, as it can be seen from expression (1):

$$\delta\Delta = \frac{\lambda_0}{2} = 2\sqrt{1-\sin^2 i_0} \cdot (t_{max} - t_{min}) \quad (5)$$

At the normal incidence ($i_0=0$) the equation (5) gives the result, which can be found in the description of Newton fringes [1]:

$$t_{max} - t_{min} = \frac{\lambda_0}{4} \quad (6)$$

Straight line fringes indicate that the surfaces are flat but inclined to each other at a slight angle. The deviation from the flatness between two points on the surface of the wafer can, however, be measured by the number of curved fringes that are located on the interference pattern between these points of interest. Using equation (6) this deviation from flatness can be expressed in the number of wavelengths $\lambda_0$ per unit of distance along the surface of the wafer.

The formation of the interference pattern demands coherence of waves in beams 48 and 50, so the fluctuation in phases of two waves correlates to the time and distance between them. To obtain the interference pattern by dividing the natural wave into two parts (or beams), it is mandatory that the difference in optical paths Δ would be less than the length of coherence $l_c$ of the wave: $\Delta < l_c$.

By the determination, the coherence time $t_c$ is the time interval during which the random change of the wave phase becomes equal to the value of the order of π radian. This determination allows for the estimation of the length of coherence since $l_c = c \cdot t_c$, where c—is velocity of light. The time of coherence has the order of magnitude, which can be estimated using the frequency interval Δω or the line width of the source of light:

$$t_c \approx \frac{\pi}{\Delta\varpi} \quad (7)$$

The expression (7) shows that larger Δω corresponds to a shorter time of coherence and length of coherence. In terms of wavelength, the time of coherence has the form:

$$t_c \approx \frac{\lambda^2}{c \cdot \Delta\lambda} \quad (8)$$

The low pressure sodium tube, which has been used in the interferometer set-up, possesses the following parameters: $\lambda_0=589.6$ nm, $\Delta\lambda=0.6$ nm. Substitution of these numbers into expression (8) gives the value of the time of coherence of the order of magnitude: $t_c \sim 10^{-12}$ sec, and corresponding length of coherence of the order of 0.3 mm.

Thus, for the case of application of the low pressure Sodium vapor tube, the difference of the optical path Δ should be less than 0.3 mm, and the thickness of the air film between the wafer and optical glass flat must be at least two times less than $$\Delta: t \leq 0.15 \text{ mm} \quad (9)$$

Since expressions (9), (8), and (7) give only the order of magnitude, it is reasonable to assume the length of coherence of the order of 0.1 mm, and the limiting thickness of air film of the order of 50 μm. This value of limiting thickness is large enough to provide ease of adjustment to the interferometer when one measures the flatness of the wafer, and after changing the sample under test.

As detailed above, the coherence length of the sodium light source is long enough to observe fringes of equal inclination in transmitted and in reflected light as detailed, for instance, on page 281 of the book by M. Born and E. Wolf entitled "Principles of Optics" published by Pergamon Press in 1965, now part of the Reed Elsevier group based in Amsterdam. This kind of non-localized interference pattern can be observed if the telescope objective of the camera is focused on infinity. By analyzing the symmetry of the pattern in the plane, which is parallel to the surface of a thin transparent wafer, one can conclude that the fringes are concentric circles around the normal wafer axis. The circular symmetry takes place if both surfaces of the wafer are plane and parallel to each other. Thus the perfection of the circles and their relative position can be used for evaluation of the parallelism of wafer surfaces. Features of this type of interference pattern will be analyzed here from the point of practical necessity.

If an interference pattern of fringes is observed in transmitted light, then the intensity varies according to the variation in optical paths. There are bright fringes when the following equation is satisfied:

$$\Delta = 2 \cdot t_1 \cdot \sqrt{n_1^2 - \sin^2\theta_i} = m \cdot \lambda_0 \quad (10)$$

where $\theta_i$—is the angle of inclination of the light beam, corresponding to i-th circle when it is counted from the center of pattern. At the center $\theta_0=0$, and the difference of optical paths is equal to:

$$\Delta = 2 \cdot t_1 \cdot n_1 = m_0 \cdot \lambda_0 \quad (11)$$

where $m_0$—is the number of wavelength $\lambda_0$ on the doubled optical thickness of the wafer.

When $m_0$ is the integer, then the central part of the pattern is bright, and the i-th bright circle corresponds to:

$$m = m_0 - i \qquad (12)$$

This is what is required to calculate the angle of inclination for any bright circle.

For the very first circle the equation (10) can be transformed to:

$$n_1^2 - \sin^2\theta_1 = \frac{(m_0 - 1)^2 \lambda_0^2}{4 \cdot t_1^2} \qquad (13)$$

Equation (11) shows that the index of refraction of the wafer material can be expressed through wavelength $\lambda_0$ and thickness $t_1$, so its square is:

$$n_1^2 = \frac{m_0^2 \cdot \lambda_0^2}{4 \cdot t_1^2} \qquad (14)$$

Using equations (14) and (13) after some transformations one can write:

$$\sin^2\theta_1 = \frac{(2m_0 - 1)\lambda_0^2}{4 \cdot t_1^2} \qquad (15)$$

Thus the angle of inclination, corresponding to the first bright circle of the pattern, is determined by the thickness of the wafer, wavelength of light, and the number $m_0$, and with a high accuracy can be written in the form:

$$\theta_1 = \arcsin \frac{(2m_0)^{\frac{1}{2}} \cdot \lambda_0}{2 \cdot t_1} \qquad (16)$$

An analogous procedure can be carried out for angles of second, third, fourth and so on including i-th circle. Results collect in series:

$$\sin\theta_1 = \frac{\sqrt{1}\,(2m_0)^{\frac{1}{2}} \cdot \lambda_0}{2 \cdot t_1},$$

$$\sin\theta_2 = \frac{\sqrt{2}\,(2m_0)^{\frac{1}{2}} \cdot \lambda_0}{2 \cdot t_1},$$

$$\sin\theta_3 = \frac{\sqrt{3}\,(2m_0)^{\frac{1}{2}} \cdot \lambda_0}{2 \cdot t_1},$$

$$\ldots$$

$$\sin\theta_i = \frac{\sqrt{i}\,(2m_0)^{\frac{1}{2}} \cdot \lambda_0}{2 \cdot t_1} \qquad (17)$$

where i—is the number of i-th bright circle. When angles of inclination are very small, as in the case of fringes localized at infinity (seen far from the wafer), then $\sin\theta_i = \theta_i$, and series (17) gives angles of inclination with very high accuracy. This series shows that angles of inclination increase in transition from circle to circle as the square root of its number, and they are expressed in radians.

When the pattern of fringes is observed by telescope objective, then measurable radius of i-th circle can be expressed by focus length F and angle $\theta_i$:

$$R_i = F \cdot \theta_i. \qquad (18)$$

Equation (18) allows writing the series analogous to (17) one for radii of circles. So the ratio of i-th radius to the radius of antecedent circle (i.e. (i−1)-th circle) is equal to:

$$\frac{R_i}{R_{i-1}} = \sqrt{\frac{i}{i-1}}. \qquad (19)$$

For example, it shows $$\frac{R_2}{R_1} = \sqrt{\frac{2}{1}} = 1.414;$$

$$\frac{R_3}{R_2} = \sqrt{\frac{3}{2}} = 1.225;$$

$$\frac{R_4}{R_3} = \sqrt{\frac{4}{3}} = 1.155;$$

$$\frac{R_5}{R_4} = \sqrt{\frac{5}{4}} = 1.118;$$

$$\ldots;$$

$$\frac{R_{20}}{R_{19}} = \sqrt{\frac{20}{19}} = 1.026;$$

This is the law of increasing the radius of circles in a series that form the pattern of fringes of equal inclination. It can be seen that the bigger the number of the circle, the closer it is placed to the previous circle. So the ratio (19) seeks to 1 when number i is very high. The equation (16) also shows that the decrease of thickness $t_1$ of the wafer leads to increase of angles of inclination, and so to the increase of radii of circles.

Equation (19) is satisfied if the observation is carried out along the normal to the surface of the wafer (i.e. along the axis of the circular pattern) and the thickness of the wafer is constant, so that wafer is a plane parallel plate. This feature allows the estimate of the wafer parallelism.

If a pattern consists of concentric circles which obey the law (19), it means that deviation from ideal parallelism, or the relative deviation of the thickness $\delta t_1/t_1$, is a very small value. This is much less than the ratio of the wavelength to the doubled optical thickness of the wafer:

$$\frac{\delta t_1}{t_1} \leq \frac{\lambda_0}{2 \cdot t_1 \cdot n_1}. \qquad (20)$$

Numerical evaluation of the parallelism of wafer surfaces for the case of a fused silica UV grade wafer, having a typical thickness of 0.5 mm is as follows:

$$\lambda_0 = 589.6 \text{ nm}$$

$$t_1 = 0.5 \text{ mm}$$

-continued $$n_1 = 1.458$$

$$\frac{\delta t_1}{t_1} \leq 4 \times 10^4 \text{ or } \delta t \leq 0.2 \ \mu m. \qquad 5$$

The value of thickness deviation should be much less than 0.2 μm at the distance between two neighboring circles of the interference pattern, when the law (19) is satisfied.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. An interferometer for measuring surfaces of large thin, transparent wafers, comprising:
    a light source emitting light having a coherence length;
    a holding mechanism for holding a transparent wafer having a first surface located such that a normal to said first surface of said wafer is substantially horizontal;
    a diffusely reflecting background screen located inclined at an angle to said normal such that said emitted light is diffusely reflected towards said transparent wafer when positioned in said holding mechanism; and
    a reference flat surface located essentially parallel to said first surface of said transparent wafer when positioned in said holding mechanism and capable of being separated from a first surface of said transparent wafer when positioned in said holder by a distance less than or comparable to one quarter of said coherence length of said light source such that a first pattern of interference fringes representing a difference in flatness between said first surface and said reference surface is localized in a vicinity of said reference surface.

2. The interferometer of claim 1 wherein said diffusely reflecting background screen further comprises one or more trapezoid markings positioned to appear as a uniform grid when said first pattern of interference fringes is viewed.

3. The interferometer of claim 2 wherein said angle to said normal is approximately 30 degrees.

4. The interferometer of claim 3 wherein said light source comprises a sodium vapor lamp emitting substantially monochromatic light.

5. The interferometer of claim 4 wherein said monochromatic light has a wavelength of approximately 589.6 nm and a coherence length of the order of a mm or less.

6. The interferometer of claim 5 wherein said light source further comprises a parabolic reflecting surface and a substantially transparent diffusing surface located such that a second pattern of interference fringes representing a difference in how parallel said first surface of said wafer is to a second surface of said wafer, said second pattern of interference fringes being located substantially at infinity.

7. The interferometer of claim 5 wherein said holding mechanism comprises a wafer holder cassette and a ring holder for locating said transparent wafer.

8. An interferometric method for measuring surfaces of large thin, transparent wafers, said method comprising the steps of:
    providing a light source emitting light having a coherence length;
    locating a transparent wafer having a first surface such that a normal to said first surface of said transparent wafer is substantially horizontal;
    locating a diffusely reflecting background screen inclined at an angle to said normal such that said emitted light is diffusely reflected towards said transparent wafer; and
    locating a reference flat surface essentially parallel to said first surface of said transparent wafer and separated from said first surface by a distance less than or comparable to one quarter of said coherence length of said light source such that a first pattern of interference fringes representing a difference in flatness between said first surface and said reference surface is localized in a vicinity of said first surface.

9. The method of claim 8 wherein said locating step comprises locating a separation at which said reference flat surface said first surface of said transparent wafer move essentially in concert but are separated by a finite gap.

10. The method of claim 9 further comprising observing said first pattern of fringes from an angle such that one or more trapezoid markings on said diffusely reflecting background screen appear as a uniform grid background to said first pattern of interference fringes.

11. The method of claim 10 wherein said angle of said diffusely reflecting background screen is approximately 30 degrees.

12. The method of claim 11 wherein said light source comprises a monochromatic light source.

13. The method of claim 11 wherein said light source comprises a sodium vapor lamp emitting substantially monochromatic light having a wavelength of approximately 589.6 nm and a coherence length of the order of a mm or less.

14. The method of claim 13 wherein said light source further comprises a parabolic reflecting surface and a substantially transparent diffusing surface, and further comprising the step of observing a second pattern of interference fringes representing a difference in how parallel said first surface of said wafer is to a second surface of said wafer, said second pattern of interference fringes being located substantially at infinity.

15. The method of claim 13 further comprising providing a wafer holder cassette and a ring holder for locating said transparent wafer.

16. An interferometric apparatus for measuring surfaces of large thin, transparent wafers, comprising:
    a light source emitting light having a coherence length;
    holding means for locating a transparent wafer having a first surface such that a normal to said first surface of said transparent wafer is substantially horizontal;
    background screen means for diffusely reflecting said emitted light at an angle towards said transparent wafer located in said holding means; and
    means for locating a reference flat surface essentially parallel to a first surface of said transparent wafer located in said holding means and separated from said first surface by a distance less than or comparable to one quarter of said coherence length of said light source such that a first pattern of interference fringes representing a difference in flatness between said first surface and said reference surface is localized in a vicinity of said reference surface.

17. The apparatus of claim 16 further comprising means for locating a separation at which said reference flat surface said first surface of said transparent wafer move essentially in concert but are separated by a finite gap.

18. The apparatus of claim 17 further comprising means observing said first pattern of fringes from an angle such that one or more trapezoid markings on said diffusely reflecting background screen appear as a uniform grid background to said first pattern of interference fringes.

19. The apparatus of claim 12 wherein said light source further comprises parabolic means for reflecting surface and a substantially transparent means for diffusing, and further comprising the means for observing a second pattern of interference fringes representing a difference in how parallel said first surface of said transparent wafer is to a second surface of said transparent wafer, said second pattern of interference fringes being located substantially at infinity.

20. The apparatus of claim 19 further comprising a wafer holding cassette means and a plurality of precision, interchangable ring holder means for locating said transparent wafer.

* * * * *